United States Patent
Badey et al.

(10) Patent No.: US 7,969,061 B2
(45) Date of Patent: Jun. 28, 2011

(54) METHOD FOR PRODUCING A ROTOR COMPRISING A STEP OF MACHINING GROOVES IN THE TEETH OF THE POLES, AND ROTOR OBTAINED BY SAID METHOD

(75) Inventors: Jean-Philippe Badey, Etaples sur Mer (FR); Romaric Lenoir, Sainte Cecile (FR); Marc Tunzini, Versailles (FR); Pierre-Yves Bilteryst, Brimeux (FR)

(73) Assignee: Valeo Equipments Electriques Moteur, Cretail (FR)

( * ) Notice: Subject to any disclaimer, the term of this patent is extended or adjusted under 35 U.S.C. 154(b) by 114 days.

(21) Appl. No.: 12/294,334

(22) PCT Filed: Apr. 26, 2007

(86) PCT No.: PCT/FR2007/051179
§ 371 (c)(1),
(2), (4) Date: Sep. 8, 2009

(87) PCT Pub. No.: WO2007/132105
PCT Pub. Date: Nov. 22, 2007

(65) Prior Publication Data
US 2010/0013339 A1 Jan. 21, 2010

(30) Foreign Application Priority Data
May 16, 2006 (FR) ...................... 06 51769

(51) Int. Cl.
*H02K 15/02* (2006.01)
(52) U.S. Cl. .......................... 310/263; 29/598

(58) Field of Classification Search .................. 310/263, 310/156.66–156.73; 29/598
See application file for complete search history.

(56) References Cited

U.S. PATENT DOCUMENTS

| | | | | |
|---|---|---|---|---|
| 4,558,511 A * | 12/1985 | Kato | | 29/598 |
| 4,759,117 A * | 7/1988 | Kato | | 29/598 |
| 4,959,577 A * | 9/1990 | Radomski | | 310/263 |
| 5,016,340 A * | 5/1991 | Kato | | 29/598 |
| 6,486,585 B1 * | 11/2002 | Badey et al. | | 310/263 |
| 6,548,935 B1 * | 4/2003 | Shendi et al. | | 310/263 |
| 2002/0067101 A1 * | 6/2002 | Armiroli et al. | | 310/263 |
| 2004/0178696 A1 | 9/2004 | Tajima et al. | | |
| 2008/0315714 A1 * | 12/2008 | Badey et al. | | 310/261 |
| 2008/0315716 A1 * | 12/2008 | Itoh et al. | | 310/263 |
| 2010/0257723 A1 * | 10/2010 | Gas et al. | | 29/598 |
| 2010/0289371 A1 * | 11/2010 | Pfleger et al. | | 310/181 |

FOREIGN PATENT DOCUMENTS

| | | |
|---|---|---|
| EP | 1 227 566 | 7/2002 |
| FR | 2 793 085 | 11/2000 |
| JP | 5-56616 | 3/1993 |

* cited by examiner

*Primary Examiner* — Dang D Le
(74) *Attorney, Agent, or Firm* — Berenato & White, LLC (57) ABSTRACT

A method for producing a claw-pole rotor, including: a step of mounting polar wheels on the shaft in such a way that each tooth of a polar wheel is located in the existing space between two consecutive teeth of the other polar wheel; a step of machining the lateral faces facing two adjacent teeth, whereby an axial groove is machined in each lateral face; and a step of mounting a magnetic element between two adjacent teeth such that the magnetic element is received in the axial grooves. The method is characterized in that the step of machining lateral faces is carried out before the step of mounting polar wheels on the shaft. The invention also relates to a rotor obtained by such a method.

19 Claims, 6 Drawing Sheets

METHOD FOR PRODUCING A ROTOR COMPRISING A STEP OF MACHINING GROOVES IN THE TEETH OF THE POLES, AND ROTOR OBTAINED BY SAID METHOD

CROSS-REFERENCE TO RELATED APPLICATIONS AND CLAIM TO PRIORITY

This application relates to International Application No. PCT/FR2007/051179 filed Apr. 26, 2007 and French Patent Application No. 0651769 filed May 16, 2006, of which the disclosures are incorporated herein by reference and to which priority is claimed.

FIELD OF THE INVENTION

The invention proposes a method of producing a claw rotor for a rotating electrical machine, comprising a central shaft and two magnet wheels, each magnet wheel extending radially overall with respect to the main axis of the central shaft and comprising at its outer periphery a series of overall trapezoidal shaped teeth, which extend axially in the direction of the other magnet wheel, of the type which comprises:
- a step of mounting the magnet wheels on the shaft so that each tooth of one wheel is situated in the space existing between two consecutive teeth of the other wheel;
- a step of machining the facing lateral faces of two adjacent teeth each belonging to a magnet wheel, which consists of machining an axial groove in each lateral face, and
- a step of mounting a magnetic element between two adjacent teeth, so that the magnetic element is housed partly in the axial grooves machined in the facing lateral faces of two adjacent teeth.

PRIOR ART

This claw rotor also comprises a core coaxial with the shaft and inserted between the end shields that the magnet wheels have. A field coil is mounted on the core.

In such a method of mounting the rotor during which, after mounting the field coil on the core, the two wheels are first of all pressed using a compacting press against one another via the core either side of the field coil in order to allow an optimal flow of magnetic flux through the core, and are then mounted on the central drive shaft comprising, in order to do this, at least one non-smooth drive section.

The angular positioning of one wheel with respect to the other is carried out by means of indexing pins temporarily interposed between the two magnet wheels during the pressing or compacting operation.

Next, the shaft is press-fitted into the bores of the magnet wheels. A drive section of the shaft, which is accommodated for example in the bores of the wheels, comprises raised parts, for example knurling in the form of ribbing or serrations, in order to rotationally fix the shaft and the magnet wheels.

After the shaft has been fitted into the bores of the magnet wheels, the facing lateral faces of the teeth are machined, in particular by milling, in order to obtain the axial grooves that are intended to accommodate the magnetic elements.

These machinings make it possible to obtain accurate dimensions for mounting the magnetic elements and avoid offsets of the grooves with respect to one another.

Finally, the magnetic elements, generally permanent magnets, are mounted in the housings delimited by two facing axial grooves.

During these operations of machining the facing lateral faces of the teeth and the outer peripheral face of the magnet wheels, hot slivers are liable to be thrown onto the field coil which thus risks being damaged. These machining operations cannot be carried out using a lubricant which also risks damaging the field coil and are therefore made longer and more expensive.

Finally, the dimensions of the milling cutter used during the step of machining the lateral faces of the teeth are limited by the dimensional characteristics of the teeth. This is because the maximum diameter of the tang of the milling cutter is determined according to the distance between the facing lateral faces of two adjacent teeth, which limits the diameter of the cutting tip of the milling cutter. The depth of the grooves is therefore also limited.

OBJECT OF THE INVENTION

In order to solve these problems, the invention proposes a production method of the type described previously, characterized in that the step of machining the lateral faces of two adjacent teeth is implemented before the step of mounting the magnet wheels on the shaft directly or indirectly.

By virtue of the invention, this machining step can be carried out with removal of material and lubrication of the tool, for example by milling, but also without removal of material for example by forging or pressing.

During this step, the field coil is not present and therefore does not risk being damaged.

According to other characteristics, considered individually and/or in combination, of the production method:
- the machining step consists of machining the groove in the lateral face of an associated tooth, in particular by milling, so that the groove is non-emergent at at least one axial end of the associated tooth;
- the machining step consists of machining each lateral face of an associated tooth, in particular by milling, so that the groove is non-emergent at the outer axial end of the associated tooth, at which the tooth is connected to the outer radial end edge of the associated magnet wheel;
- the machining step consists of machining the groove in the lateral face of an associated tooth, in particular by milling, so that the groove is non-emergent at both axial ends of the associated tooth in order to weaken the tooth as little as possible and for better holding of the magnetic element;
- the step of mounting the magnetic element comprises a first sub-step of mounting this element in the axial groove made in the lateral face of a first tooth of two adjacent teeth, and a second sub-step of mounting the magnetic element in the axial groove made in the lateral face of the second adjacent tooth;
- the first sub-step of the step of mounting the magnetic element is implemented prior to the step of mounting the magnet wheels on the shaft directly or indirectly;
- the second sub-step of the step of mounting the magnetic element is implemented simultaneously with the step of mounting the magnet wheels on the shaft directly or indirectly;
- the method comprises a step of adjusting the axial position of each magnet wheel with respect to the other magnet wheel, which consists of machining an inner axial end face of each wheel;
- the step of machining the inner axial end face is implemented prior to the step of mounting the magnet wheels on the shaft;
- the step of mounting the magnet wheels on the shaft consists of axially arranging the magnet wheels either side of a core, so that the inner axial end face of each magnet wheel rests axially against a facing associated inner axial end face of the core;

the method comprises in one embodiment a step of mounting the shaft in at least one intermediate sleeve;

the step of mounting the shaft in the sleeve is implemented prior to the step of mounting the magnet wheels on the intermediate sleeve;

the step of mounting the magnet wheels on the intermediate sleeve consists of fitting each magnet wheel onto an outer cylindrical surface of the intermediate sleeve;

the method comprises a step of machining the outer and inner diameter of each magnet wheel before putting the magnet wheels on the intermediate sleeve.

The invention also proposes a claw rotor for a rotating electrical machine obtained by a method according to any one of the preceding claims, which comprises a central shaft, a core and two magnet wheels, in which each magnet wheel extends overall radially with respect to the main axis of the central shaft and comprises a series of overall trapezoidal shaped teeth, which extend axially in the direction of the other magnet wheel, so that each tooth of one magnet wheel is situated in the space existing between two consecutive teeth of the other magnet wheel, which comprises at least one magnetic element arranged between two adjacent teeth each belonging to one of the two magnet wheels, and which is accommodated partly in a groove made in each of the facing lateral faces of said adjacent teeth.

This rotor is characterized in that each groove is non-emergent at at least one axial end of the associated tooth.

According to other characteristics of the rotor:

each groove is non-emergent at the outer axial end of the tooth, which is connected to the outer radial end edge of the associated magnet wheel;

each groove is non-emergent at both axial ends of the associated tooth;

each magnet wheel comprises a central bore for its positioning coaxially with the shaft via an intermediate sleeve into which the shaft is fitted and which is fitted into the bore of each wheel.

BRIEF DESCRIPTION OF THE DRAWINGS

Other characteristics and advantages of the invention will emerge from a reading of the following detailed description, for the understanding of which reference should be made to the accompanying figures, amongst which.

DESCRIPTION OF EXAMPLE EMBODIMENTS OF THE INVENTION

Figure 1:
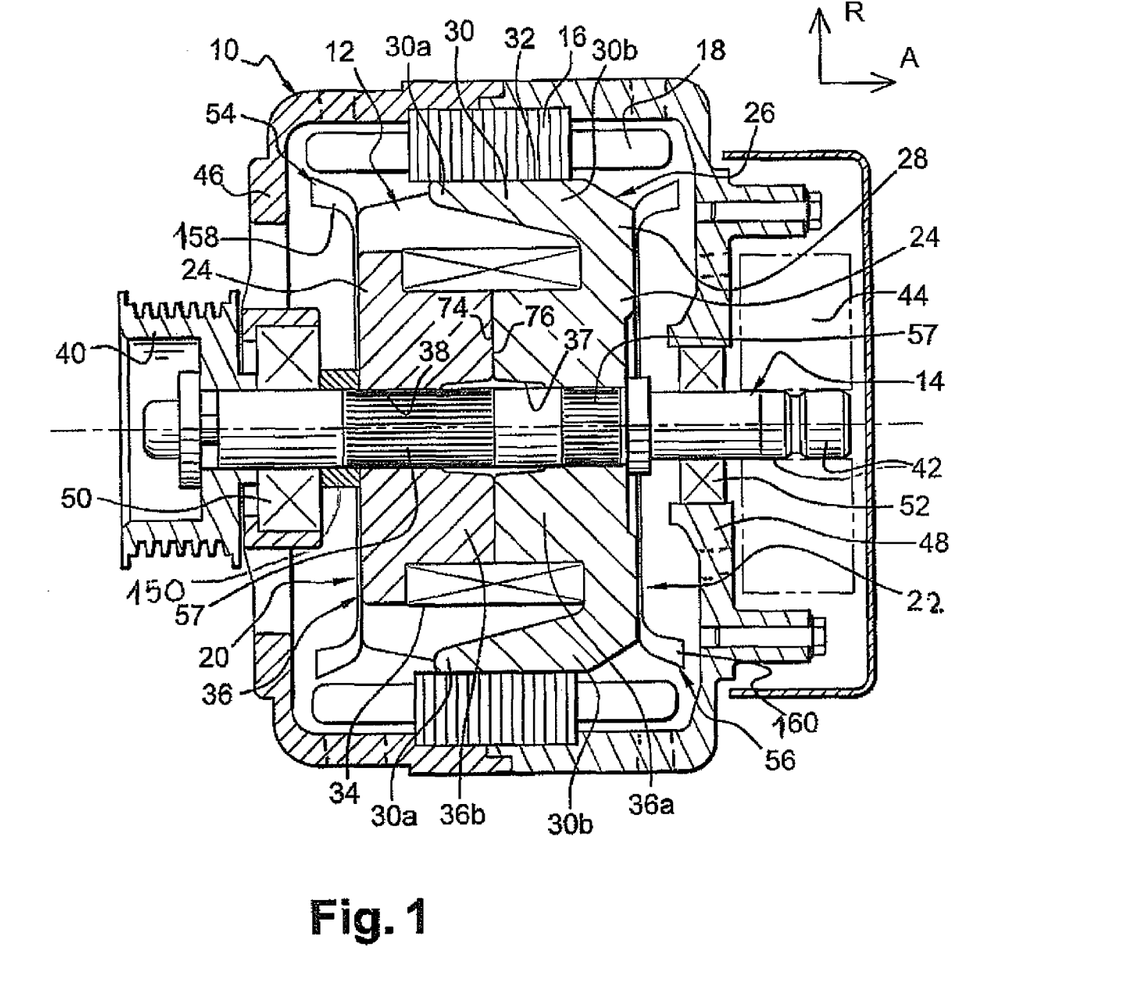
FIG. 1 is a view in axial section of an alternator provided with a rotor.

In the remainder of the description, analogous, similar or identical elements will be designated by the same reference number and an axial and radial orientation indicated by the arrows "A" and "R" of FIG. 1 will be adopted.

Furthermore, the axial end faces oriented respectively towards the middle of the rotor and in the opposite direction will be called inner faces and outer faces.

FIG. 1 depicts a rotating electrical machine, in the form of a multiphase alternator for a motor vehicle with a heat engine. In a variant, the alternator is reversible and consists of an alternator starter in particular for starting the heat engine of the vehicle as described for example in the document FR A 2 725 445.

This machine comprises a casing 10 and, inside the latter, a claw rotor 12 rotationally fixed to a central shaft 14 and a stator 16, 18 which surrounds the rotor 12 and which comprises a body 16 in the form of laminations provided with slots for mounting a stator coil 18 forming an external winding overhang at each axial end of the body 16.

This coil 18 comprises at least one winding per phase. The outputs of the windings are connected to at least one bridge rectifier (not depicted) comprising rectifying elements such as diodes or transistors of the MOSFET type, in particular when the machine is reversible.

The windings, mounted in the slots in the body 16, are obtained for example by means of a continuous, electrically conductive wire, covered with an insulating layer or in a variant by means of conductors in the form of rods, such as pins, connected to one another for example by welding.

The bridge rectifier or rectifiers of the multiphase alternator make it possible to rectify the alternating current produced in the stator coil 18 into a D.C. current in particular for charging the battery of the motor vehicle and supplying the electrical loads of the on-board electrical network of the vehicle.

The claw rotor 12 comprises two magnet wheels 20, 22 placed side by side axially and each having a radial end shield 24 provided at its outer periphery with claws 26.

The magnet wheels 20, 22 are obtained by forging, stamping or with a bending press.

Each end shield 24 is annular in shape and extends radially with respect to the main axis of the central shaft 14.

Each claw 26 comprises (FIGS. 1 and 2) a rooting section 28 radially oriented in the plane of the end shield 24 concerned. This section 28 is extended at its outer periphery by a tooth 30 with overall axial orientation.

Figure 2:
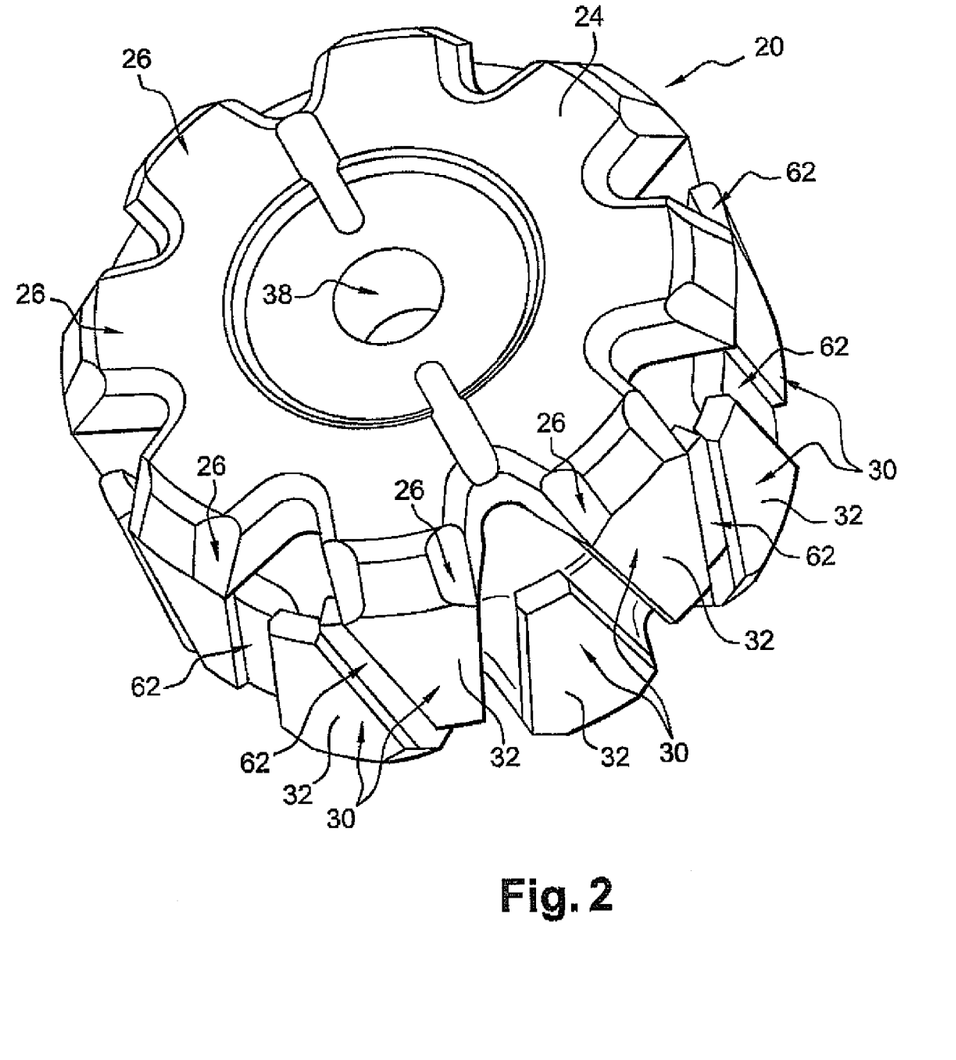
FIG. 2 is a schematic depiction in perspective of the magnet wheels of the rotor depicted in FIG. 1, which comprises magnets mounted between the axial teeth in accordance with the invention.

The claws 26 of a magnet wheel therefore extend to the outer periphery of the end shield of this wheel and an annular air gap exists between the outer peripheral face 32 of the teeth 30 and the inner periphery of the body 16 of the stator.

The teeth 30 therefore extend to the outer periphery of the magnet wheels and are of overall trapezoidal shape. The teeth of one magnet wheel are directed axially towards the end shield of the other magnet wheel, a tooth of one magnet wheel entering the space existing between two consecutive teeth of the other magnet wheel, so that the outer teeth 30 are interlinked and the magnet wheels are mounted head to tail.

A field coil 34 is installed axially between the end shields 24 of the wheels 20, 22 and is carried by a part 36 of the rotor 12 in the form of a cylindrical annular core coaxial with the shaft 14. This core 36 comprises a central bore 37 and here consists of two axially distinct sections 36a, 36b, each of which is made in one piece of material with its associated wheel 20, 22.

Figure 6:
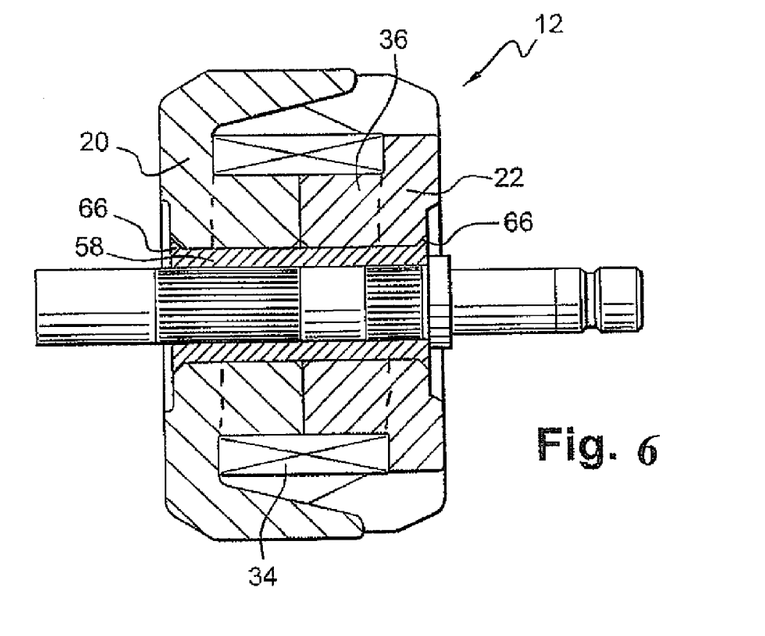
FIG. 6 is a view analogous to FIG. 5 in which the magnet wheels are fixed to the intermediate sleeve by crimping.

In a variant depicted by dotted lines in FIG. 6, the central core 36 with a bore 37 is made in a single piece separate from the magnet wheels 20, 22, which are arranged axially either side of the core 36.

In all cases, the coil 34 is mounted axially between the end shields 24 and the rooting sections 28 of the wheels 20, 22, being carried by the core 36. This coil 34, installed in the space delimited by the claws 26 of the wheels 20, 22 and the central core 36, is put in place before mounting of the magnet wheels on the shaft 14 of the rotor 12.

In the remainder of the description, the term "coil" without a qualifier is to be understood as the field coil 34 and not as the coil 18 of the stator 16, 18.

The magnet wheels 20, 22 and the core 36 are preferably made of ferromagnetic material and are passed through coaxially by the shaft 14. To that end, each wheel 20, 22 comprises a central bore 38, which passes axially through the end shield 24 and extends the bore 37 of the core 36.

In one embodiment, the wire of the field coil 34 is wound on an annular support made of electrically insulating material (not depicted) mounted, preferably press-fitted, on the outer periphery of the core 36. This support has for example an overall U-shaped axial cross-section for isolating the coil 34 from the end shields 24 of the wheels 20, 22.

According to a variant, not depicted, the core 36 is in one part and the wire of the coil 34 is wound on an insulator fixed on the core 36 and is shaped to avoid any contact with the end shields 24 and the teeth 30 of the magnet wheels 20, 22.

When the coil 34 is supplied electrically, the magnet wheels 20, 22 and the core 36 are magnetized and the rotor 12 becomes an inductive rotor with the formation of magnetic poles at the claws 26, one of the wheels then carrying north poles and the other carrying south poles.

This inductive rotor 12 creates an alternating induced current in the stator 16, 18 in that case induced when the shaft 14 of the rotor 12 turns.

The shaft 14 has at its front axial end a drive member, such as a pulley 40 (FIG. 1) or in a variant a gear, belonging to a device for transmitting movements by means of at least one belt or chain or gear (not depicted) between the alternator and the heat engine of the motor vehicle.

This shaft 14 has, at its rear axial end of reduced diameter, slip rings 42 connected by wire links to the ends of the field coil 34.

Brushes, belonging to a brush holder 44, are disposed so as to rub on the slip rings 42, in order to supply the coil 34 with electric current. The brush holder 44 is connected to a voltage regulator (not depicted).

In FIG. 1, the casing 10 is made in two parts, namely a front end plate 46 adjacent to the pulley 40 and a rear end plate 48 carrying the brush holder 44 and most often the bridge rectifier or rectifiers and the voltage regulator. The end plates 46, 48 are hollow in shape and each has a ball bearing 50, 52, respectively, for rotational mounting of the shaft 14.

The alternator 10 is provided with cooling means.

Thus, in FIG. 1, the end plates 46, 48 are perforated for cooling of the alternator by air circulation and the rotor 12 has at least at one of its axial ends a fan 54, 56 intended to provide this circulation of the air. In FIG. 1 a first fan 54 is fixed on the forward front face of the rotor 12 and a second, more powerful fan 56 is fixed on the rear back face. Each fan is provided with a plurality of blades 158, 160.

In a variant, not depicted, the alternator is cooled by a heat-conducting fluid, the casing 10 then being configured to comprise an appropriate circulation channel for the heat-conducting fluid.

Of course the casing 10 can comprise more than two parts, an intermediate part carrying the body of the stator being for example inserted between the end plates 46, 48. This intermediate part can be cooled by a heat-conducting fluid.

Each tooth 30 comprises (FIG. 4) an outer axial face 32, an inner axial face 66 and two flat lateral faces 68 forming two of the sides of the trapezium, and connecting the inner 66 and outer 32 axial faces. The faces 32, 66 are flat overall.

Figures 3, 4:
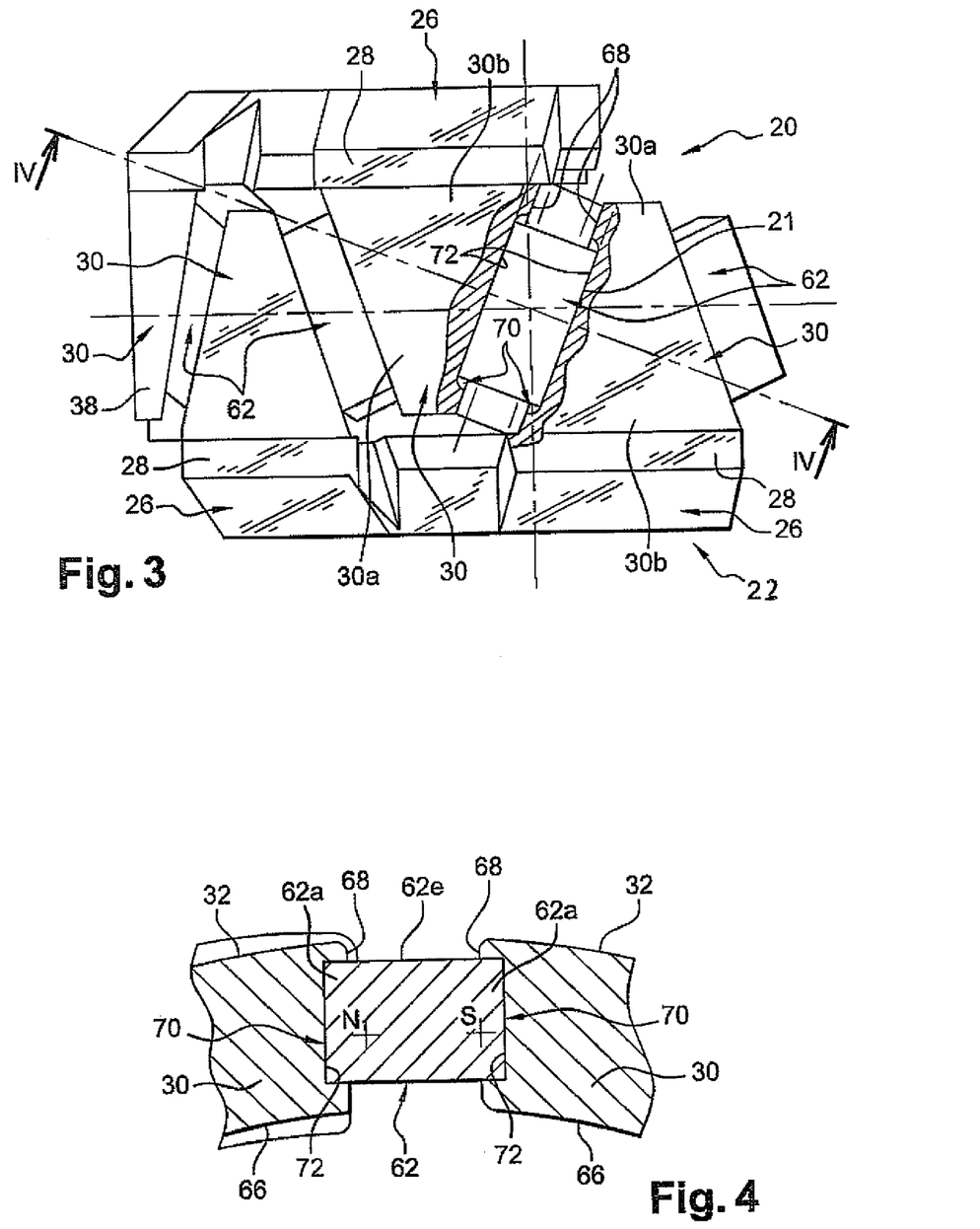
FIG. 3 is a partial view with part torn away and on a larger scale of the magnet wheels and magnets depicted in FIG. 2, in an overall radial direction.
FIG. 4 is a sectional view along the line 4-4 of the teeth depicted in FIG. 3.

Each lateral face 68 of a first tooth 30 of a first magnet wheel 20 extends parallel to and at a distance from the facing lateral face 68 of a second tooth 30 adjacent to the first tooth 30, and belonging to the other magnet wheel 22.

Subsequently, two teeth 30 mounted head to tail, each of which belongs to one of the two wheels 20, 22 and having a lateral face 68 facing the lateral face 68 of the other tooth 30, will be designated as being two adjacent teeth 30.

In FIG. 2, the rotor 12 comprises eight teeth 30 per magnet wheel and therefore eight pole pairs. Forty-eight slots are provided in the body of the stator in the case of a 3-phase alternator, or ninety-six slots in the case of an alternator with two 3-phase windings per phase and two bridge rectifiers. Of course the rotor 12 can, depending on application, comprise a different number of pole pairs. For example each magnet wheel can in a variant comprise six or seven teeth.

In FIGS. 2 to 4, the rotor 12 comprises magnetic elements 62, in the form of permanent magnets 62, interposed between two adjacent teeth 30. These elements 62 reduce magnetic flux leakages in the space between two adjacent teeth 30 and contribute towards strengthening the magnetic flux and increasing the performance of the machine.

According to one embodiment, the number of these magnets 62 is determined so that it is less than the number of pole pairs of the rotor 12 and their disposition is symmetrical with respect to the axis of the rotor 12. For example, four or six pairs of magnets 62 are provided for eight pole pairs which allows cooling of the machine thanks to the free spaces—those not occupied by the magnets 62—between the teeth 30.

In a variant, the number of these magnets is determined so that it is equal to the number of pole pairs of the rotor, for example eight for eight pole pairs.

In the following description, reference will be made to two adjacent teeth 30 and the associated magnet 62. Moreover, in FIGS. 3 and 4, vertical, longitudinal and transverse orientations for which the longitudinal orientation corresponds to the main axis of the magnet 62, the transverse orientation corresponds to the normal to the lateral face 68 of two adjacent teeth 30 and the vertical orientation to the radial orientation R will be adopted on a non-limiting basis.

As the teeth 30 and the associated magnets 62 are identical, it will be understood that this description applies in an identical manner to the other teeth 30 and magnets 62.

The facing lateral faces 68 of the two peripheral teeth 30, overall trapezoidal in shape as can be seen in FIG. 3, each comprise a groove 70, or channel, which extends in the longitudinal direction of the lateral face 68 and in which the magnet 62 is partly housed.

Each groove 70 has a longitudinal main orientation and extends overall between the two axial ends 30a, 30b of the associated tooth 30. The cross-section of the groove 70 in a transverse vertical plane is in the shape of a "U", open transversely towards the other groove 70.

The magnet 62 comprises two transverse end sections 62a, each of which is housed in an associated groove 70. The cross-section of the magnet is rectangular, so that each transverse end section 62a of the magnet is accommodated without play in the associated groove 70.

It will be appreciated that the magnet 62, here of an overall parallelepipedal shape, is held in place well and cannot escape under the action of the centrifugal force on account of the configuration of its associated U-shaped grooves 70, which are delimited by an upper edge forming one of the arms of the U.

In one embodiment, the magnets 62 are mounted with slight mounting play in the grooves 70.

According to a variant embodiment, for example described in the French patent FR-2.784.248, the rotor 12 comprises a strip or small plate which covers the outer face 62e of the magnet and which is interposed between the magnet and the upper transverse edge of each groove 70.

This magnetic element 62 can be in two connected parts and thus comprise two magnets connected to each other by a layer of more flexible material as can be seen for example in FIG. 4 of document FR-2.784.248.

Figure 8:
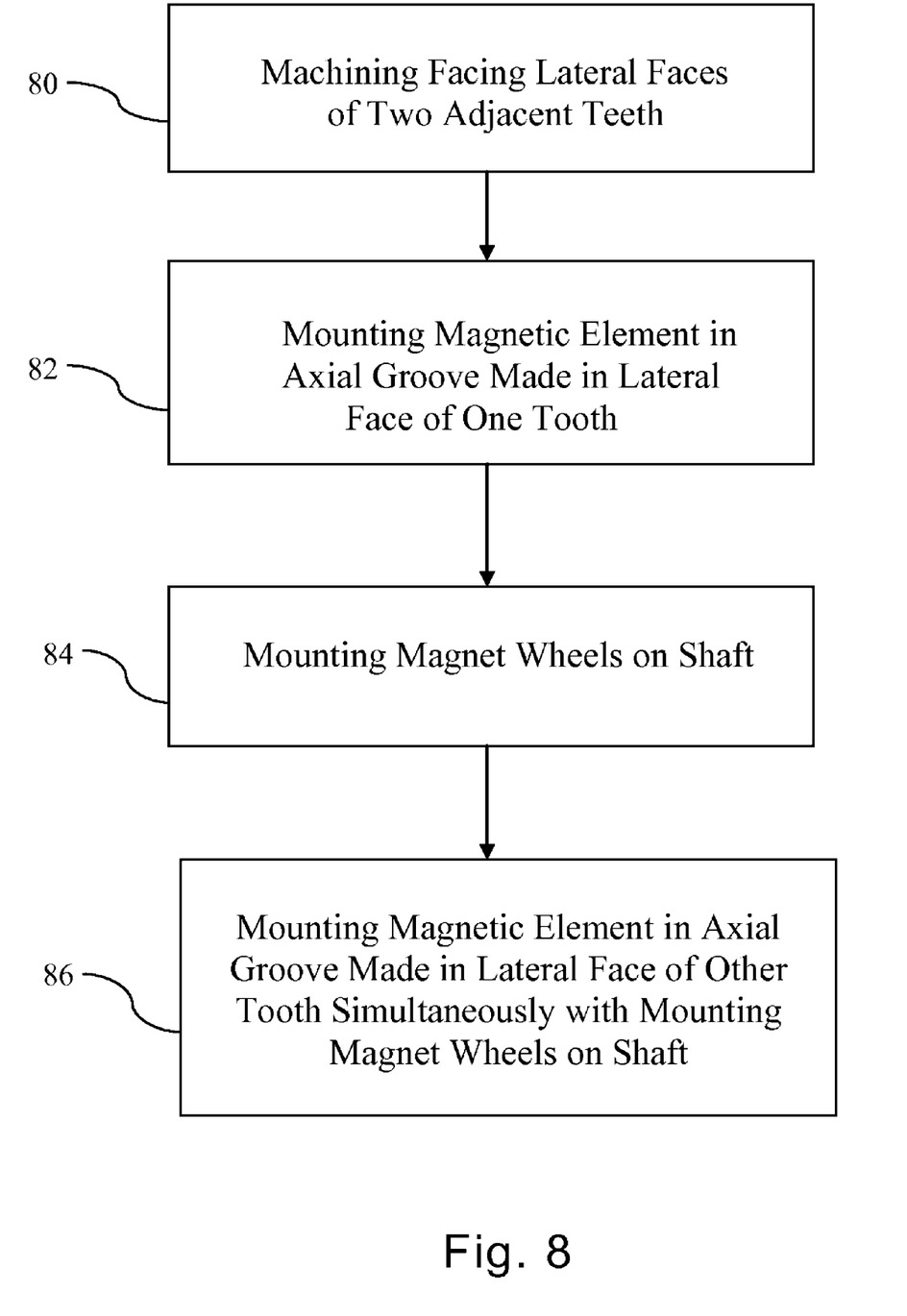
FIG. 8 is a flow chart illustrating the steps for the method according to the invention.

The method of producing the rotor 12, illustrated in FIG. 8, comprises a step 84 of mounting the magnet wheels 20, 22 onto the shaft 14, which consists of fitting the shaft 14 into the bore 37, 38 of the core 36 and of each magnet wheel 20, 22.

Figure 5:
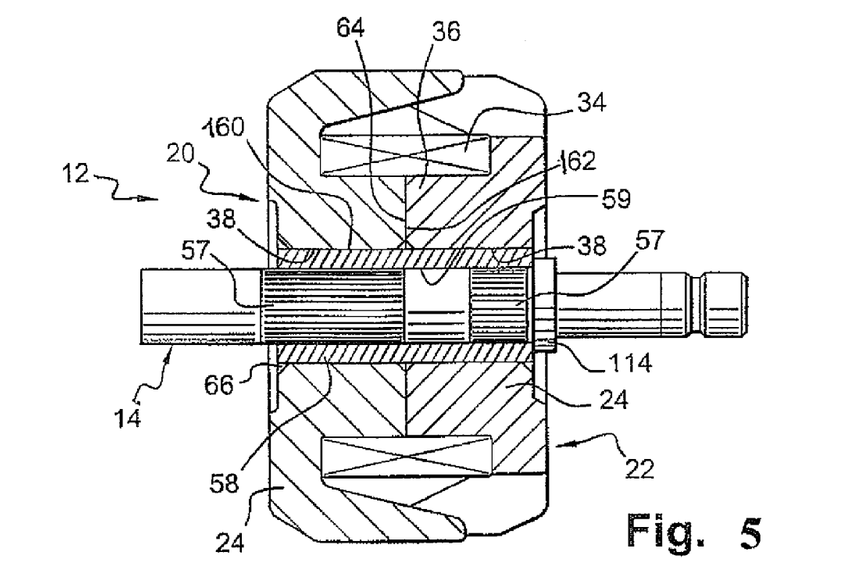
FIG. 5 is a view in axial section of a rotor provided with an intermediate sleeve.
Figure 7:
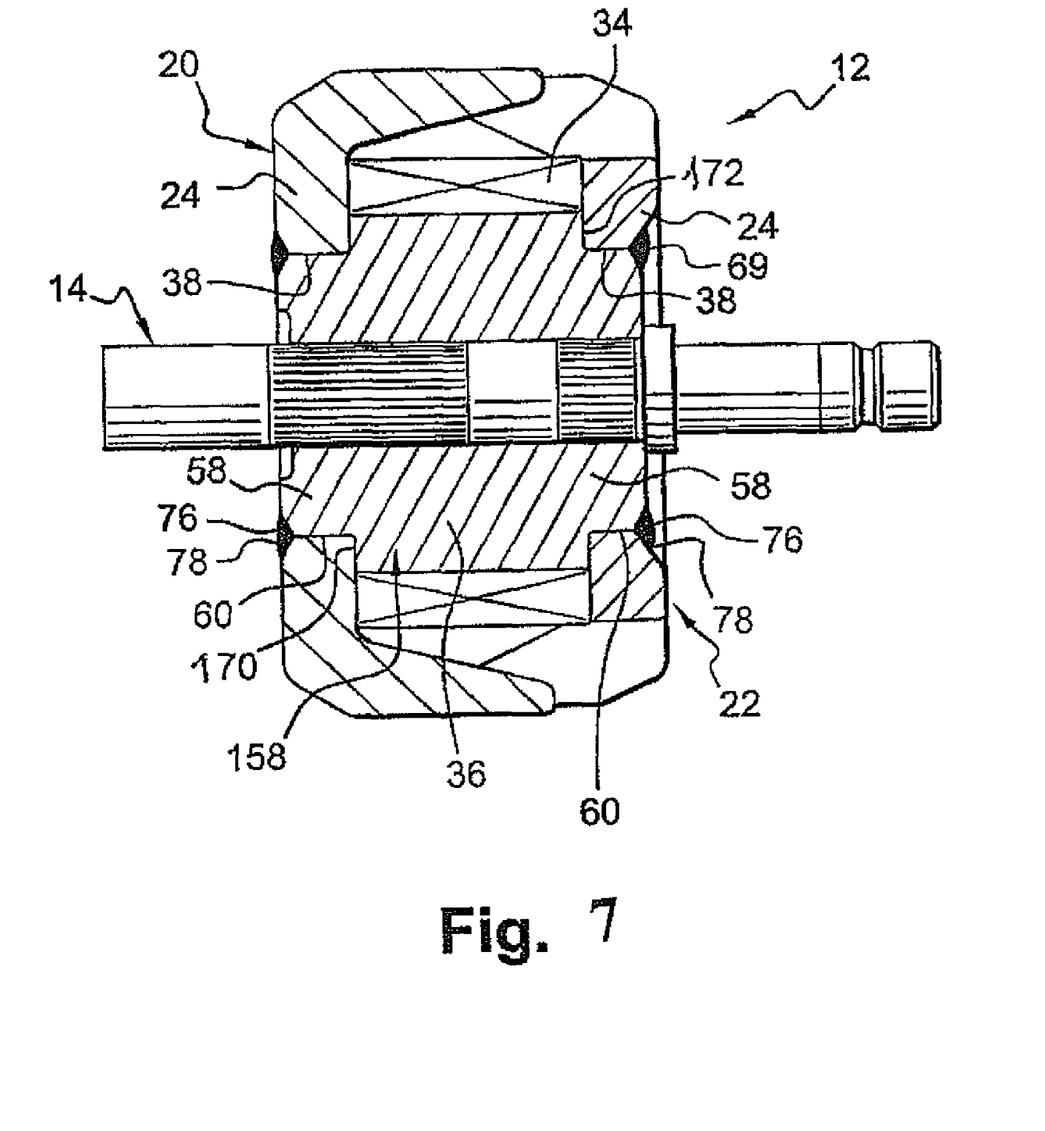
FIG. 7 is a view analogous to FIG. 5 in which the magnet wheels are fixed to the intermediate sleeve with a central hub by welding.

This fitting is carried out directly in FIG. 1 or indirectly via at least one sleeve 58, 158 in FIGS. 5 to 7.

To that end, the shaft 14 comprises at least one drive section 57 associated with each magnet wheel 20, 22 and which is accommodated in the bore 38 of the associated magnet wheel 20, 22.

In the embodiments described (FIGS. 1 and 5 to 7) two sections 57 of different length are provided. In a variant, a single section 57 common to the two wheels is provided.

This section or these sections 57 have a non-smooth radial cross-section. The section or sections 57 are provided with raised parts consisting here of knurling with knurled serrations.

In the embodiment of FIG. 1, these serrations are press-fitted into the bores 37, 38 for fixing and driving the magnet wheels 20, 22 and the core 36 with the shaft 14, which is thus rotationally fixed to the wheels 20, 22.

In FIGS. 5 to 7, the shaft 14 with its sections 57 is press-fitted into the inner bores of the sleeve or sleeves 58, 158 for fixing and driving the sleeve or sleeves, and the magnet wheels are mounted on the outer periphery of the sleeve or sleeves and then fixed to the sleeve or sleeves in the manner described below.

The method of producing the rotor 12, illustrated in FIG. 8, also comprises a step 80 of machining the lateral faces 68 of the teeth 30, in order to produce the grooves 70, and a step of mounting the magnets 62 in the associated grooves 70.

In accordance with the invention, the step 80 of machining the lateral faces 68 of the teeth 30 is implemented before the step 84 of mounting the magnet wheels 20 on the shaft 14 directly (FIG. 1) or indirectly (FIGS. 5 to 8).

Thus, the process of machining the grooves 70, for example by means of a milling cutter, is not limited by the narrow space existing between the facing lateral faces 68 of two adjacent teeth 30.

This is because, according to one characteristic, during the implementation of the machining step, the magnet wheels 20, 22 are not mounted on the shaft 14, and each lateral face 68 of one tooth 30 is therefore machined separately from the facing lateral face 68 of the other tooth 30. The space in front of each lateral face 68 is clear, and it is therefore possible to use a tool implementing the machining step, whereof the dimensions are not limited.

Moreover, since the space in front of the lateral face 68 to be machined is clear, engaging and/or disengaging the tool can be carried out transversely, that is to say perpendicular to the lateral face 68. There is no risk of slivers damaging the coil 34 not mounted on the core of the rotor at this stage. The depth of the groove 70 and the tool for machining the groove can have the required size since there is no hindrance by the adjacent tooth. The tool can also be lubricated since the coil 34 is not present at this stage.

According to another aspect of the invention, the machining step consists of machining each lateral face 68 so that the groove 70 obtained is non-emergent at at least one of its longitudinal ends, as can be seen in FIG. 3.

According to a first embodiment of the method in accordance with the invention, the machining step consists of machining the lateral face 68 so that the groove 70 is non-emergent at the outer axial end 30b of the associated tooth 30 closest to the end shield of the magnet wheel concerned.

Thus, there is no removal of material at the outer axial end 30b of the tooth 30, by which the tooth 30 is connected to the rooting section 28 of the claw 26. Thus, the tooth 30 is not weakened and the claw 26 has more rigidity.

Thus in one embodiment each adjacent tooth 30 has a groove 70 non-emergent at its end 30b.

According to a second embodiment (FIG. 3), the machining step consists of machining the lateral face 68 so that the groove 70 is non-emergent at the outer axial end 30b and at the inner axial end 30a of the tooth 30 closest to the free end of the tooth 30.

Thus, there is no removal of material at the ends 30a, 30b of the tooth 30 and this tooth 30 is even less weakened, which further improves the rigidity of the claw 26.

Thus in one embodiment each adjacent tooth 30 has a groove 70 non-emergent at its ends 30b, 30a.

Of course the length of the groove 70 depends on the length of the magnet, which can have the desired length.

In a variant, there are a certain number of teeth which have a groove non-emergent at one of the ends 30a, 30b and the others at the other of the ends 30b, 30a.

In all cases, thanks to the grooves 70, housings are formed allowing better holding of the magnets 62, which cannot escape, in particular by virtue of the ends 30a, 30b.

It will be appreciated that, in a variant, the machining is carried out without removal of material, for example by forging.

In accordance with another aspect of the method according to the invention, the step of mounting the magnet 62 in the associated groove 70 of each tooth 30 is implemented, at least partly, before the step of mounting the magnet wheels 20, 22 on the shaft 14 directly or indirectly This is because, since the space in front of the lateral face 68 is clear when the two magnet wheels 20 are separate from each other, it is easier to transversely house the transverse end sections 62a of the magnet 62 in the associated grooves 70 than when the two magnet wheels 20 are in position mounted on the shaft 14.

Moreover, when each groove 70 is non-emergent at the outer axial end 30b and/or the inner axial end 30a of the associated tooth 30, it is not possible to introduce the transverse end sections 62a of the magnet 62 into the associated grooves 70.

The step of mounting the magnet 62 thus comprises a first sub-step 82 of mounting the magnet 62, during which one transverse end section 62a of the magnet 62 is housed in the associated groove 70 of one of the two teeth 30, and it comprises a second sub-step 86 of mounting the magnet 62 during which the other transverse end section 62*a* of the magnet 62 is housed in the associated groove 70 of the other tooth 30.

The second sub-step 86 is carried out by bringing the second magnet wheel axially closer to the first magnet wheel in which the magnet has already been mounted during the first sub-step 82.

Thus the overall trapezoidal shape of the teeth is taken advantage of, allowing, during the axial movement of the second wheel with respect to the first wheel, mounting of the magnet in the groove in the second wheel.

According to one embodiment of the step of mounting the magnet 62, the first sub-step 82 of mounting the magnet 62 is implemented before the step 84 of mounting the magnet wheels 20, 22 on the shaft 14, and the second sub-step 86 of mounting the magnet 62 is implemented simultaneously with the step 84 of mounting the magnet wheels 20, 22 on the shaft 14, when the wheels 20, 22 are pressed axially against each other, as illustrated in FIG. 8.

During the time period between the first sub-step of mounting the magnet 62 and the second sub-step of mounting the magnet 62, the magnet 62 is held in position mounted in the associated groove 70 by the use of temporary or permanent fixing means, for example by using an adhesive of the type of that used in the French patent FR-2.784.248.

As said previously, and as depicted in FIGS. 3 and 4, the magnet 62 is housed with slight mounting play in the grooves 70.

Now, according to the prior art, the two grooves 70 are machined simultaneously, and by a single tool, which makes it possible to obtain correct positioning of the grooves 70 facing each other and it is therefore easy to limit the play between the magnet 62 and the bottom 72 of each groove.

However, according to the production method in accordance with the invention, the two grooves 70 are produced during two operations distinct from each other, and before the mounting of the magnet wheels 20, 22 on the shaft 14.

The method according to the invention therefore comprises a step of adjusting the axial position of each magnet wheel 20, 22 with respect to each other.

Combined with the angular positioning of the two magnet wheels 20, 22 with respect to each other, the axial positioning of the magnet wheels 20, 22 with respect to each other makes it possible to control the transverse distance between the bottoms 72 of the two grooves 70, thus making it possible to reduce the transverse play of the magnet 62 in the teeth.

This adjustment step is implemented before the step of mounting the magnet wheels 20, 22 on the shaft 14, and it consists of machining at least one inner axial end face of each wheel 20, 22 by which the wheel 20, 22 rests axially against a facing axial end face of the core.

According to the embodiment depicted in FIGS. 1 and 5, for which the core consists of two sections 36*a*, 36*b*, each of which is produced in one piece of material with an associated magnet wheel 20, 22, the adjustment step consists of machining the facing inner axial end faces respectively 74, 76 and 162, 164 of the two sections 36*a*, 36*b* of the core 36.

These faces 74, 76-162, 164 here have a radial orientation.

During mounting of the magnet wheels 20, 22 on the shaft 14, the inner faces 74, 76-162, 164 of each half of the core 36 rest axially against each other thus allowing the axial positioning of the wheels 20, 22 with respect to each other.

Of course this bringing to the resting position is carried out later after the coil 34 has been put in place.

Next these axial end faces are pressed against each other by means of a compacting press in order to allow an optimum flow of magnetic flux through the core.

This press has indexing pins installed in the end shields, more precisely in the free spaces between the claws 26 (see FIG. 2).

According to another embodiment (FIG. 7) of the wheels 20, 22 and the core 36, the core 36 forms a single piece which is distinct from the magnet wheels 20.

The core 36 comprises two outer axial end faces 170, 172 against each of which the inner face of the end shield 24 of each magnet wheel 20, 22 rests. These outer faces here have a radial orientation.

In this variant, the axial positioning of one magnet wheel 20 with respect to the other is carried out by the inner face of each end shield 24 which rests axially against a facing outer face 170, 172 of the core 36.

According to this other embodiment, the adjustment step consists of machining the two outer faces of the core 36 and the facing inner face of the end shield 24 of each wheel 20, 22.

The shaft 14 is made from a harder material than that of the wheels 20 and the core 36, so that the drive sections 57 of the shaft 14 cut furrows in the bores 38 of the magnet wheels 20 and in the core 36 during the mounting step, thus causing a plastic deformation of the bore 38 of the wheel 20, 22 in a radial direction in a non-uniform manner. This plastic deformation does not allow a sufficiently accurate concentricity of the magnet wheels 20 with respect to the axis of rotation of the shaft 14 to be obtained, and the grooves 70 associated with the magnet can then be offset radially with respect to each other.

Moreover, the force necessary for axially pressing the wheels against each other does not allow an accurate axial positioning of the wheels with respect to each other to be obtained.

Furthermore, the serrations of the drive section of the shaft are never oriented perfectly straight in an axial direction, but they are generally helical in form around the shaft which constitutes a fault.

Thus, during the fitting of the drive section of the shaft into the magnet wheels pressed against each other, the helical form of the serrations causes the appearance of a torsional stress between the bore of each wheel and the shaft, which is liable to cause a relative rotational movement of the two magnet wheels with respect to each other when the axial stress is relaxed.

In order to limit such problems, according to another aspect the method of producing the rotor 12, the step of mounting the magnet wheels on the shaft is carried out indirectly.

Thus this method of producing the rotor 12 comprises in one embodiment a step of mounting the shaft 14 in at least one intermediate sleeve 58, 158 of tubular (FIGS. 5 and 6) or tiered (FIG. 7) form. The sleeve is made from the same material as the magnet wheels 20, 22 and the core 36.

This step of mounting, here press-fitting, of the shaft in the sleeve leads to a plastic deformation of the sleeve.

For this reason, this mounting step is in one embodiment implemented before a step of mounting the wheels 20, 22 on the sleeve and moreover comprises a sub-step of machining at least one outer cylindrical surface of the sleeve 58, 158, so that the cylindrical surface is coaxial with the main axis of the shaft 14 in order to compensate for the consequences of the plastic deformation of the sleeve.

This surface is smooth and therefore allows an easy relative translational and rotational movement between the magnet wheels and the sleeve 58, 158.

This intermediate sleeve 58, 158 therefore comprises one or more outer smooth parts on which the inner periphery of the wheels 20, 22 are later mounted in close contact so that the sleeve is radially interposed between each knurled drive section 57 of the shaft 14 and the associated bore 38, 37 of each magnet wheel 20, 22.

The method therefore also comprises in this case a step of machining the diameters of the magnet wheels before the step of mounting the shaft 14.

During this machining step, the outer diameter and the inner diameter of each magnet wheel are machined so that in particular the inner bore 38, 37 comes into close contact with the outer surface or surfaces of the intermediate sleeve 58, 158.

This is carried out before the coil 34 is put in place.

Therefore, during the step of mounting the magnet wheels 20, 22 on the shaft 14, the wheels are mounted on the cylindrical surface, which is itself coaxial with the shaft 14. Moreover, the step of mounting the magnet wheels 20, 22 on the shaft 14 takes place without deformation of the wheels 20, 22 or of the sleeve, which makes it possible to provide that the magnet wheels 20, 22 are coaxial with respect to the shaft 14, and therefore that the grooves 70 are situated at the same radial dimension with respect to each other.

Thus the outer and inner diameter of each magnet wheel can be machined in advance by means of a tool that is lubricated without risking damaging the coil 34, whilst increasing the service life of the tool.

This machining operation is carried out as wished before or after the formation of the grooves 70.

This operation is advantageously carried out before or at the same time as the aforementioned adjustment step followed by a step of mounting the coil 34 on the core of the rotor.

In FIGS. 5 and 6, the intermediate sleeve 58 is tubular in form with an inner bore 59, and a core 36 in two sections with inner faces 162, 164 is provided in the aforementioned manner. In one embodiment, at least one of these faces is provided with a chamfer to facilitate mounting on the sleeve 58.

The axial positioning of the wheels 20, 22 is therefore carried out by the facing faces 162, 164 of each section of the hub 36 and the bore 38 is lengthened to include the bore 37 of FIG. 1 so that the inner periphery of each wheel 20, 22 is in close contact with the outer periphery of the sleeve 58.

In this Figure, the shaft 14 has at the rear a shoulder in the form of a collar 114 (not referenced in FIG. 1). The rear end of the sleeve 58 rests on this collar 114 after mounting of the shaft 14, this collar 114 limiting the movement of the shaft 14 with respect to the sleeve 58.

The front end of the sleeve 58 is intended to come to rest on the tubular spacer 150 of FIG. 1 axially interposed between the sleeve 58 and the bearing 50. This spacer 150 is passed through by the shaft 14. The sleeve 58 is therefore intended to be mounted between the collar 114 and the spacer 150 so that it allows the stresses in the magnet wheels 20, 22 to be reduced.

This sleeve is a single piece in FIG. 5. In a variant it is divided into a plurality of sleeves mounted end to end.

In a non-limiting manner, the sleeve 58 is made from the same ferromagnetic material as the wheels 20, 22 and the core 36.

Of course, in FIGS. 5 to 7 the rotor 12 comprises means for rotationally fixing the magnet wheels 20, 22 with the intermediate sleeve 58, 158, which is itself rotationally fixed here with drive sections 57 of the shaft 14 press-fitted into the inner bore of the sleeve 58, 158.

In FIGS. 5 and 6 at least one arc of the outer circular edge of the central bore 38 of each magnet wheel 20 comprises a chamfer 66 (FIGS. 5 and 6). The chamfer is capable of accommodating by crimping a deformed part of material of the sleeve 58 (FIG. 6). This chamfer 66 emerges at the outer axial end face of the end shield 24 concerned opposite respectively to the face 162 and the face 164.

To that end, the sleeve is advantageously made from a ductile ferromagnetic material such as soft iron which is particularly adapted to crimping.

Moreover, each chamfer 66 is delimited angularly by two radial end faces which make it possible to immobilize rotationally around the shaft 14 the magnet wheels 20, 22 with respect to the sleeve. It is therefore preferred, for fixing each magnet wheel 20, 22 and the sleeve rotationally, that the chamfer 66 extends only over an arc of the circumference of the central bore 38 of each magnet wheel 20, 22 and not over the entire circumference of the bore 38 so that the material deformed by crimping of the sleeve enters this arc.

In a variant, there are at least two pairs of radial faces and two arcs filled by the material of the sleeve 58.

The crimping also makes it possible to axially immobilize the magnet wheels 20, 24 with respect to the sleeve.

According to a variant, not depicted, the chamfer is replaced or supplemented by notches.

According to a variant, not depicted, the chamfer is carried by an outer edge of each axial end of the surface of the sleeve 58, and each wheel 20, 22 is crimped into the chamfer.

According to yet another variant, not depicted, each wheel 20, 22 is fixed to the sleeve by welding. Thus, a weld, preferably continuous, is made between the circumference of the outer edge of the bore 38 and the sleeve 58.

In FIG. 7, the diameter of the sleeve 158 is tiered whilst being in a single piece with the core 36 distinct from the wheels 20, 22. This core is installed axially between the end shields 24 of the magnet wheels 20, 22.

This sleeve 158 comprises two tubular outer sleeves 58.

Each sleeve 58 has at its outer periphery a cylindrical surface 60 machined so that this surface is concentric with the axis of rotation of the shaft 14. This surface 60 is intended to come into close contact with the inner periphery of the end shield 24 of the magnet wheel concerned for centering the latter.

These tubular sleeves 58 are disposed either side of the core 36 of greater radial size, here of greater diameter, so that there are shoulders 170, 172 present at the axial ends of the core 36 allowing axial resting of the end shield 24 respectively of the magnet wheel 20 and of the magnet wheel 22. The shoulders 170, 172 replace the faces 162, 164 of FIG. 5. The sleeve 158 therefore has a core 36 projecting radially with respect to the sleeves 58.

Two chamfers 176, 178 are made in correspondence in the outer radial face of the sleeve 58 and of the end shield 24 of the magnet wheel concerned. Each magnet wheel is thus fixed by welding 69 thanks to the chamfers 176, 178.

In a variant, the fixing is carried out by crimping as in FIG. 6.

In this embodiment, the end shields 24 can be of reduced height and the sleeves 58 of larger diameter.

The sleeve 158 can be standard and be used for mounting magnet wheels of different outer diameter.

For the requirements of the description, the rotor 12 has been described here arranged in an alternator. However, the rotor 12 is not limited to this application.

The outer periphery of the core 36 is cylindrical in the embodiments depicted. In a variant it has another shape, for example rectangular or polygonal.

In a rotor produced according to the embodiment of FIG. 1, the force necessary for mounting the magnet wheels directly on the drive section of the shaft is very high. Consequently, the axial distance between the two magnet wheels is less controlled than in FIGS. 5 to 7 and it is necessary to provide a broad tolerance range.

By virtue of the teachings of FIGS. 5 to 7, the force sufficient for mounting the magnet wheels 20, 22 on their externally smooth intermediate sleeve 58, 158 is sufficiently reduced to substantially reduce this tolerance range.

In the rotor of FIG. 1, it is necessary to provide greater play between each axial end of the coil and the end shield of each magnet wheel. The rotor 12 produced according to the teachings of FIGS. 5 to 7 makes it possible to obtain a more accurate axial positioning of the magnet wheels 20, 22 with respect to each other. It is therefore possible to install a longer coil 34 between the two magnet wheels 20, 22 which makes it possible to increase the power of the alternator.

Advantageously, the accuracy of the axial distance between the two wheels 20, 22 of a rotor 12 of FIGS. 5 to 7 is improved compared with that of a rotor according to FIG. 1. It is thus possible to provide a coil 34 which occupies as well as possible the space between the outer periphery of the core 36 and the claws 26, in particular within the context of the embodiment of FIG. 7.

The axial length of the body of the stator in comparison with the axial length between the two magnet wheels can also be adjusted better.

Similarly, as the axial distance between the two magnet wheels 20, 22 is better controlled, a rotor 12 according to the teachings of FIGS. 5 to 7 makes it possible to arrange more powerful fans at the two ends of the rotor 12 without increasing the axial size of the alternator. Thus the rear fan 56 of FIG. 1 is in a variant a ventilation device comprising two superposed fans as described for example in the document WO 2004/106748 to which reference should be made.

Another advantage is that it is also possible to reduce the axial size of the alternator.

The ratio between the outer diameter of the core and the outer diameter of the rotor can be controlled better.

In general terms, the power of the alternator is controlled better and the losses thereof are reduced.

By virtue of the invention, there is no need to modify the shaft 14 of the rotor 12 and therefore a shaft 14 of the standard type, which is provided in FIGS. 5 to 7, can be used. More precisely, the shaft 14 has a reduced diameter at the rings 42. By virtue of the intermediate sleeve, the effort exerted on the rear part of the shaft 14 for fitting, for example using a press, it into the sleeve 58, 158 is reduced.

It will also be understood that simple mechanical inversions can constitute variant embodiments of the invention. For example, the rotor 12 comprises a plurality of sleeves, for example two sleeves, which are arranged end to end around the shaft 14 and each of which is associated with one of the two magnet wheels 20.

By virtue of the invention, there is no risk of damaging the coil 34 and the magnets 62 are held in place well.

By virtue of the invention, the length of the magnets can be adjusted in an appropriate manner and a desired number of magnets mounted in order to adjust the characteristic curve of the alternator.

All combinations are possible. For example, the second sub-step of the step of mounting the magnetic element 62 is implemented simultaneously with the step of mounting the magnet wheels 20, 22 on the shaft 14 thanks to the indexing pins of the compacting press.

One of the adjacent teeth can have a groove non-emergent at the ends 30a, 30b, as in FIG. 3, and the other tooth a groove emerging at at least one of the ends 30a, 30b, perhaps even both ends.

In a variant, the magnets and the associated grooves of the same rotor can be of different size, that is to say of different height and/or length and/or width so that the characteristic curve of the rotating electrical machine can be optimized (current flow as a function of the speed of rotation of the shaft).

As it emerges from the description and the drawings, the mounting of the magnet wheels on the shaft, for example by means of at least one intermediate sleeve, makes it possible to obtain a better positioning of the grooves machined before the step of mounting the magnet wheels indirectly on the shaft.

The invention claimed is:

1. A method of producing a claw rotor (12) for a rotating electrical machine, comprising a central shaft (14) and two magnet wheels (20, 22), each magnet wheel (20, 22) extending radially overall with respect to the main axis of the central shaft (14), and comprising at its outer periphery a series of overall trapezoidal shaped teeth (30), which extend (30) axially in the direction of the other magnet wheel (22), comprising the steps of:
   a step of mounting the magnet wheels (20, 22) on the shaft (14) so that each tooth (30) of one magnet wheel (20, 22) is situated in the space existing between two consecutive teeth (30) of the other magnet wheel(20);
   a step of machining facing lateral faces (68) of two adjacent teeth (30) each belonging to a magnet wheel (20, 22), which consists of machining an axial groove (70) in each lateral face (68);
   a step of mounting a magnetic element (62) between two adjacent teeth (30), so that the magnetic element (62) is housed partly in the axial grooves (70) machined in the facing lateral faces (68) of two adjacent teeth (30), wherein the step of machining the lateral faces (68) of two adjacent teeth (30) is implemented before the step of mounting the magnet wheels (20, 22) on the shaft (14) directly or indirectly.

2. The method according to 1, wherein the machining step consists of machining the groove (70) in the lateral face (68) of an associated tooth (30), in particular by milling, so that the groove (70) is non-emergent at least one axial end (30a, 30b) of the associated tooth (30).

3. The method according to claim 1, wherein the machining step consists of machining each lateral face (68) of an associated tooth (30), by milling, so that the groove (70) is non-emergent at the outer axial end (30b) of the associated tooth (30), at which the tooth (30) is connected to the outer radial end edge of the associated magnet wheel (20, 22).

4. The method according to claim 1, wherein the machining step consists of machining the groove (70) in the lateral face (68) of an associated tooth (30), by milling, so that the groove (70) is non-emergent at both axial ends (30a, 30b) of the associated tooth (30).

5. The method according to claim 1, wherein the step of mounting the magnetic element (62) comprises a first sub-step of mounting the magnetic element (62) in the axial groove (70) made in the lateral face (68) of a first tooth (30) of two adjacent teeth (30), and a second sub-step of mounting the magnetic element (62) in the axial groove (70) made in the lateral face (68) of the second tooth (30) of two adjacent teeth (30).

6. The method according to claim 5, wherein the first sub-step of the step of mounting the magnetic element (62) is implemented prior to the step of mounting the magnet wheels (20, 22) on the shaft (14) directly or indirectly.

7. The method according to 5, wherein the second sub-step of the step of mounting the magnetic element (62) is implemented simultaneously with the step of mounting the magnet wheels (20, 22) on the shaft (14) directly or indirectly.

8. The method according to claim 1, further comprising a step of adjusting the axial position of each magnet wheel (20, 22) with respect to the other magnet wheel (22, 20), which consists of machining an inner radial face (74, 76-62, 64) of each magnet wheel.

9. The method according to claim 8, wherein the step of machining the inner radial face (74, 76-62, 64) is implemented prior to the step of mounting the magnet wheels (20, 22) on the shaft (14) directly or indirectly.

10. The method according to claim 1, further comprising a step of mounting the shaft (14) in at least one intermediate sleeve (58, 158), and wherein the magnet wheels (20, 22) are mounted so as to be fixed on the intermediate sleeve (58, 158).

11. The method according to claim 10, wherein the step of mounting the shaft (14) in the intermediate sleeve (58, 58) is implemented prior to the step of mounting the magnet wheels (20, 22) on the intermediate sleeve (58, 158).

12. The method according to claim 10, further comprising a step of machining the outer and inner diameter of each magnet wheel before putting the magnet wheels in place on the intermediate sleeve (58, 158).

13. The method according to claim 10, wherein the step of mounting the magnet wheels (20, 22) on the intermediate sleeve (58, 158) consists of fitting each magnet wheel (20, 22) onto an outer cylindrical surface of the intermediate sleeve (58, 158).

14. The method according to claim 10, wherein the intermediate sleeve (58) is tubular in form.

15. The method according to claim 10, wherein the intermediate sleeve (158) is tiered and comprises two tubular sleeves (58) disposed either side of a core (36) of greater radial size.

16. The method according to claim 15, wherein the step of mounting the magnet wheels (20, 22) on the tiered sleeve (158) consists of axially arranging the magnet wheels (20, 22) either side of a core (36), so that the inner axial end face of each magnet wheel (20) rests axially against a facing radial associated axial end face (170, 172) of the core (36).

17. A rotor (12) for a rotating electrical machine obtained by a method according to claim 1, wherein each groove (70) is non-emergent at least one axial end (30a, 30b) of the associated tooth (30).

18. The rotor (12) according to claim 17, wherein at least one groove (70) is non-emergent at both axial ends (30a, 30b) of the associated tooth (30).

19. The rotor (12) according to claim 17, wherein each magnet wheel (20, 22) comprises a central bore (38) for its positioning coaxially with the shaft (14) via at least one intermediate sleeve (58, 158) into which the shaft (14) is fitted and which is fitted into the bore (38) of each wheel.

* * * * *